Figure 1:
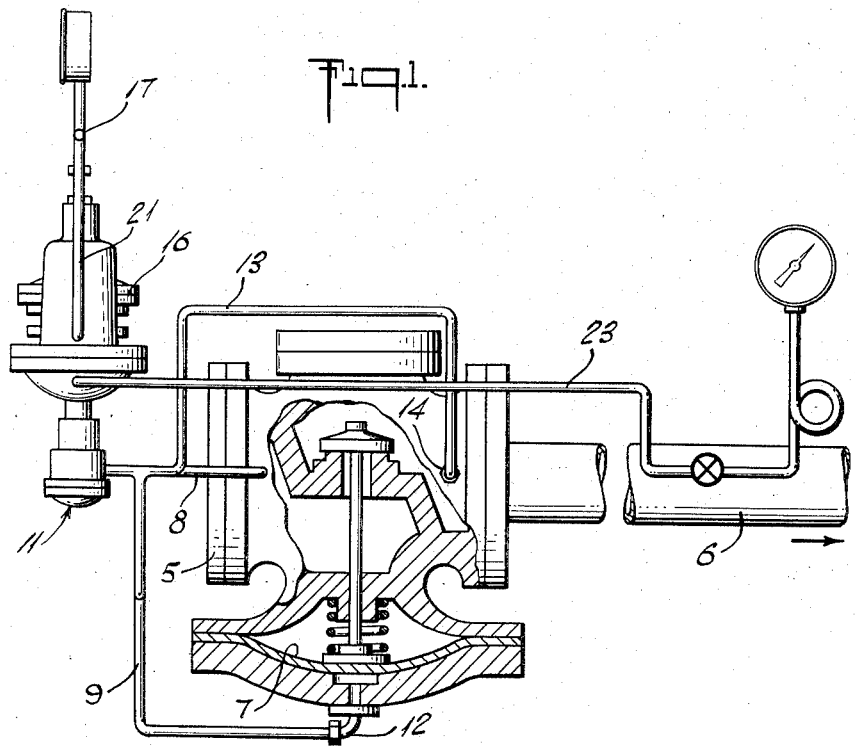

INVENTOR.
PAULSEN SPENCE
BY
*Mitchell Bechert*
ATTORNEYS

United States Patent Office 2,860,657
Patented Nov. 18, 1958

2,860,657

REGULATING VALVE

Paulsen Spence, Baton Rouge, La.

Application December 16, 1955, Serial No. 553,660

4 Claims. (Cl. 137—489.5)

My invention relates to a regulating valve, and more particularly to a combined pressure reducing valve and heating system zone control regulator.

It is an object of the invention to provide an improved combination pressure reducing valve and heating system zone control regulator.

Another object is to provide a single regulator or heating system valve, said valve being controlled by pressure in the heat control regulator system and pressure at the outlet side of the regulating valve.

It is a more specific object to provide a combined pressure reducing valve and heating system control regulator controlled jointly by the differential pressure between the pressure in the regulating system of a heat control system and the pressure in the outlet side of said main regulating valve.

It is another object to provide a combination pressure reducing valve and heating control regulator in which the pressure on the outlet side of said main regulator will be controlled substantially pound for pound with the control pressure from the heat control system.

A further object is to provide a combined pressure reducing valve and heating system control regulator which will drop the pressure from the regulator pound for pound with the drop in pressure in a heat control system, and which will shut off the regulator completely upon the attainment of a predetermined low pressure in the heat control system.

Briefly stated, in a preferred form of the invention, I provide a pressure regulator which is a combined pressure reducing valve and regulator for a heating system or a zone control of a heating system. The main regulator is fluid pressure actuated, as by means of a diaphragm. There is a fluid pressure line to the main regulator, to supply pressure fluid to the diaphragm for actuating the regulator, and in this pressure line I interpose two pilot valves in series. One is purely a pressure pilot which is controlled by the air or other fluid pressure in the air loading pressure system of a heat or weather control system and the other pilot valve is a differential pilot controlled by the differential pressure between the pressure in the heating system control or weather control, as stated, and the pressure at the outlet side of the main regulator.

The operation of the main regulator is such that the pressure delivered hereby may drop pound for pound with the drop in pressure in the weather or heat control apparatus. The main pressure pilot is set to shut off the supply of actuating fluid to the diaphragm of the main regulating valve when the air control pressure in the heating system control drops below a predetermined minimum amount. The actuating pressure to the diaphragm of the main regulator is controlled by the differential pilot which closes when the pressure in the outlet side of the main regulator rises above a predetermined point, and is dependent also upon the pressure in the heat control regulating system. The arrangement is such that the regulator may control vacuum pressures as well as positive pressures, and the differential pilot is arranged to accommodate itself to such vacuum operation when required.

Figure 2:
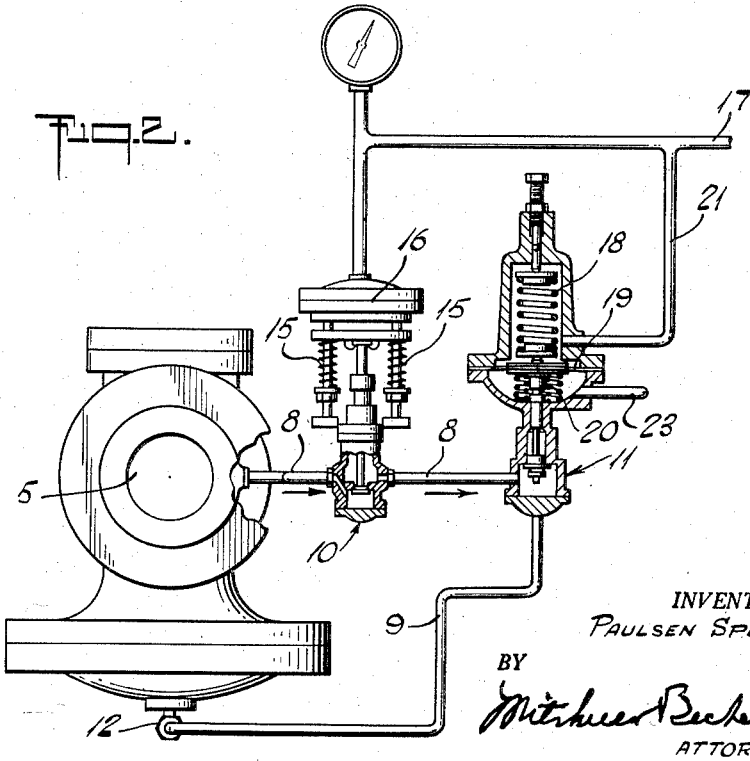

In the drawings, which show, for illustrative purposes only, a peferred form of the invention:

Fig. 1 is a side view in partial section of a main regulating valve and pressure and differential pilots connected thereto; and Fig. 2 is an end view of the parts shown in Fig. 1, parts being shown in section.

In said drawing, there is a main regulating valve having an inlet side 5 and an outlet side 6. The valve head is actuated as by means of a diaphragm 7, which is spring-pressed downwardly, as viewed in the drawings, to close the valve, and is urged upwardly to open the valve by fluid pressure in the pressure control pipe 8—9. The pressure fluid in the control pipes 8—9 preferably comes from the high pressure side 5 of the main regulator and passes through a pair of pilot valves 10—11 in series with each other. When those pilot valves are open, the pressure fluid may pass from the high pressure side of the main valve or regulator through the pilot valves, and then into the pipe 9. The latter leads through a restriction elbow 12 to the diaphragm chamber. The branch pipe 13 leads to a low pressure outlet such as the low pressure side of the main regulator through a bleed port 14. Thus, when pressure fluid enters freely through the pilot valves, the diaphragm will be raised so as to open the main regulating valve; and, when either of the pilot valves is closed, the flow of fluid pressure to the diaphragm chamber beneath the diaphragm is shut off and pressure fluid may bleed through the bleed port or restriction 14 into the low pressure side of the main valve or to other low pressure area and the main valve will close.

This regulator in its operation just described is the well-known Spence regulator, which needs no further description.

The pilot valve 10 is normally urged upwardly to closed position by means of the adjustable springs 15—15 and is urged downwardly or toward open position by pressure fluid acting above the diaphragm 16, it being understood that the underside of the diaphragm 16 is also exposed to a relatively fixed pressure, such as ambient or atmospheric air pressure. The diaphragm chamber above the diaphragm is connected through piping 17 to a source of air or other fluid pressure delivered by a weather, heating, or zone control system. Thus the position of the pilot valve 10 will be controlled by the stress of the springs 15 and the particular pressure above the diaphragm 16.

There is a second pilot valve 11 in the form of a differential pilot in series with the first pilot 10 and interposed in the control pressure line 8—9. This differential pilot 11 is urged toward open position by means of an adjustable spring 18, which acts on the valve stem to urge the valve toward open position. The valve is urged toward closed position by pressure beneath the diaphragm 19 and also by the double spring arrangement 20 in the lower diaphragm chamber. The spring chamber above the diaphragm 19 is connected by means of pipe 21 to the air control pipe 17 from the heating control system, and pressure of the heating control system also tends to open the differential pilot 11. The space beneath the diaphragm 19 is connected as by means of a pipe 23 to the low pressure side 6 of the main regulating valve. Thus the pressure in the outlet side of the main regulator also tends to close the differential pilot 11. The pilot 11 then floats and is controlled as shown by differential pressures and by the springs noted, spring 18, at least, being adjustable. The other springs may also be adjusted, but in the form shown the adjustment is made before the valve is completely assembled.

The delivery pressure of the main regulator may be set at any desirable point and the arrangement is such that the delivery pressure may be dropped pound for pound with the air pressure in the pipe 17 from the heating system controls. The pressure pilot 10, however, is so arranged that when the pressure in the heating system control reaches a predetermined low limit—for example, 1 p. s. i.—the pilot valve 11 will be shut tight and the main regulating valve will close tight. The differential pilot, as indicated, will float, depending upon the differential pressures and the spring adjustments; but, as stated, the control will be such that the outlet pressure, generally speaking, will drop pound for pound with the drop in pressure in the air control pipe 17 from the heating control system.

It will be seen that the double spring arrangement 20 permits the differential pilot valve to operate even when the main regulating valve is operating in a vacuum or negative pressure, but, as stated, when the air control pressure in the pipe 17 reaches a pre-determined low limit, the main regulator will be shut down tight.

While the invention has been described in considerable detail and a preferred form illustrated, it is to be understood that various changes may be made within the scope of the invention as defined in the claims which follow.

I claim:

1. In a regulator of the character indicated a main regulating valve, fluid pressure actuated means for operating the same, a pressure pilot, operating means therefor subject to a relatively fixed pressure and to a source of variable pressure, a differential pilot in series with said pressure pilot, said differential pilot operating in response to the differential between said variable pressure and the outlet pressure of said regulating valve, said first-mentioned pressure pilot being adjusted to shut off control pressure fluid upon the attainment of a predetermined limit of said variable pressure.

2. In a regulator of the character indicated, a main regulating valve, fluid pressure actuated means for operating the same, a pressure pilot for said main regulating valve, actuating means for said pressure pilot subject to a relatively fixed pressure and to a source of variable pressure, a differential pilot in series with said pressure pilot, said differential pilot being differentially connected to said source of variable pressure and to the outlet of said main regulating valve, whereby said main regulating valve may be regulated by the differential pressures in the outlet side of said main valve and the variable pressure from said source and may be shut off completely by the pressure pilot controlled solely by the pressure from said source.

3. In a regulator of the character indicated, a main regulating valve, fluid pressure actuated means for operating the same, a pressure pilot controlling the flow of fluid for actuating said pressure actuated means, said pressure pilot including operating means subject to a relatively fixed pressure and to a source of variable pressure, a differential pilot in series with said pressure pilot, said differential pilot being differentially connected to said source of variable pressure and to the outlet side of said main regulating valve whereby said main regulating valve may be controlled in accordance with the positions of both of said pilot valves.

4. In a regulator of the character indicated, a main regulating valve, fluid pressure actuated means for actuating said regulating valve, a pressure connection to said fluid pressure actuated means, a pair of pilot valves in series in said pressure connection, one of said pilot valves being a pressure pilot, said pressure pilot having operating means subject to a relatively fixed pressure and to a source of variable pressure, whereby said one pilot valve will be controlled in accordance with the pressure from said source, the other of said pilot valves being a differential pilot valve differentially connected to said source of variable pressure and to the pressure at the outlet side of said main regulating valve whereby said main regulating valve may be controlled by both of said pilot valves.

References Cited in the file of this patent

UNITED STATES PATENTS

| | | |
|---|---|---|
| 985,175 | Hirst | Feb. 28, 1911 |
| 1,389,370 | Metzger | Aug. 30, 1921 |
| 1,987,032 | Spence | May 8, 1931 |
| 2,635,636 | Carson | Apr. 21, 1953 |